(12) United States Patent
Akashi et al.

(10) Patent No.: US 8,992,086 B2
(45) Date of Patent: Mar. 31, 2015

(54) X-Y CONSTRAINING UNIT, AND STAGE APPARATUS AND VACUUM STAGE APPARATUS INCLUDING THE SAME

(71) Applicants: Kyocera Corporation, Kyoto (JP);
Advantest Corporation, Tokyo (JP)

(72) Inventors: Kouji Akashi, Hikone (JP); Youichi Shimizu, Nasushiobara (JP); Yoshihisa Oae, Kitaadachi-gun (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 14/015,073

(22) Filed: Aug. 30, 2013

(65) Prior Publication Data
US 2014/0064643 A1    Mar. 6, 2014

(30) Foreign Application Priority Data

Aug. 31, 2012 (JP) ................................. 2012-191209

(51) Int. Cl.
*F16C 29/12* (2006.01)
*F16C 29/00* (2006.01)
*B23Q 1/62* (2006.01)

(52) U.S. Cl.
CPC .............. *F16C 29/007* (2013.01); *B23Q 1/621* (2013.01); *F16C 29/001* (2013.01); *F16C 29/008* (2013.01); *F16C 2322/39* (2013.01); *F16C 2370/00* (2013.01)
USPC ................................... 384/9; 384/12; 384/38

(58) Field of Classification Search
CPC .... F16C 29/008; F16C 29/007; F16C 29/001; B23Q 1/621
USPC ........... 384/9, 12, 38, 57; 74/490.09; 108/143
See application file for complete search history.

(56) References Cited

U.S. PATENT DOCUMENTS

| | | | | | |
|---|---|---|---|---|---|
| 4,637,738 | A | * | 1/1987 | Barkley | 384/38 |
| 5,228,358 | A | * | 7/1993 | Sakino et al. | 108/143 |
| 5,249,867 | A | * | 10/1993 | Iida | 384/57 |
| 5,388,913 | A | * | 2/1995 | Cawley et al. | 384/38 |
| 8,104,752 | B2 | * | 1/2012 | Eidelberg | 108/143 |
| 2004/0187743 | A1 | * | 9/2004 | Kanehira | 108/20 |
| 2009/0255447 | A1 | * | 10/2009 | Schubert et al. | 108/143 |

FOREIGN PATENT DOCUMENTS

JP    2002-189090 A    7/2002

* cited by examiner

*Primary Examiner* — Thomas R. Hannon
(74) *Attorney, Agent, or Firm* — Volpe and Koenig, P.C.

(57) ABSTRACT

Provided are X-Y constraining units having excellent yawing attitude precision as well as a stage apparatus and a vacuum stage apparatus, each including the X-Y constraining units. The X-Y constraining units 8 and 9 includes: Y-axis bases 81 and 91 respectively connected to Y-axis sliders 4 and 5 and having a through hole extending along Z direction; X-axis bases 82 and 92 respectively connected to an X-axis guide rail 6; shafts 83 and 93 respectively inserted into the through hole and fixed to the X-axis bases 82 and 92; and a plurality of bearing balls which are located between an inner peripheral surface of each of the through hole and an outer peripheral surface of the shafts 83 and 93, and are arranged so as to circumferentially surround the shafts 83 and 93. Each of the stage apparatus 1 and the vacuum stage apparatus includes the X-Y constraining units.

20 Claims, 4 Drawing Sheets

X-Y CONSTRAINING UNIT, AND STAGE APPARATUS AND VACUUM STAGE APPARATUS INCLUDING THE SAME

TECHNICAL FIELD

The present invention relates to an X-Y constraining unit as well as a stage apparatus and a vacuum stage apparatus including the same.

BACKGROUND ART

Recently, a stage apparatus that transports a target transport object mounted on a table and positions the target transport object at a predetermined position is used for a precision machining apparatus and a precision measuring instrument as well as a drawing apparatus and an exposure apparatus used in semiconductor manufacturing processes. An aerostatic type air slide is usually used for a guide member included in this type of stage apparatus. Recently, an H-shaped air slide configured to arrange X and Y axes in an H-shape on a stage base is also often used to achieve high precision and low profile.

However, the conventional stage apparatus including the H-shaped air slide has had the following problem. That is, in the conventional H-shaped air slide, two Y-axis air slides are arranged parallel to each other and spaced apart from each other by a predetermined distance, and both end surfaces of an X-axis shaft included in an X-axis air slide are directly connected by a bolt or the like to side surfaces of Y-axis slides respectively included in the two Y-axis air slides. Therefore, when the two Y-axis sliders are separately driven, displacement during control is directly propagated to the Y-axis sliders. Consequently, there occurs the problem that attitude precision of rotation around Z direction, namely yawing, is deteriorated, and the Y-axis sliders and the X-axis square shaft are contacted with each other to cause scoring.

In order to solve the above problem, patent document 1 discloses an X-Y stage apparatus including a Y slider whose one end extends in an X-axis direction as a free end.

However, the X-Y stage apparatus described in the patent document 1 has the problem that the rigidity of the free end side of the Y slider is low and hence yawing attitude precision is deteriorated during acceleration and deceleration. The X-Y stage apparatus described in the patent document 1 also has the problem of being prone to oscillations because fundamental frequency differs depending on the location of the Y slider.

PRIOR ART

Patent Document

Patent Document 1: Japanese Unexamined Patent Publication No. 2002-189090

SUMMARY OF THE INVENTION

Problems to be Solved by Invention

Accordingly, an object of the present invention is to provide an X-Y constraining unit having excellent yawing attitude precision, as well as a stage apparatus and a vacuum stage apparatus each including the X-Y constraining unit.

Means for Solving the Problems

An X-Y constraining unit according to an embodiment of the present invention includes: a Y-axis base having a through hole connected to a Y-axis slider; an X-axis base connected to an X-axis guide rail; a through hole extending through one of the Y-axis base and the X-axis base along Z direction; a shaft inserted into the through hole and fixed to the other of the Y-axis base and the X-axis base; and a plurality of bearing balls located between an inner peripheral surface of the through hole and an outer peripheral surface of the shaft and arranged so as to circumferentially surround the shaft.

A stage apparatus according to an embodiment of the present invention includes the foregoing X-Y constraining unit.

A vacuum stage apparatus according to an embodiment of the present invention includes the foregoing stage apparatus and a vacuum chamber for storing therein the stage apparatus. Exhaust passages connected to each other are formed inside of each of the first Y-axis guide rail, the first Y-axis slider, the second Y-axis guide rail, the second Y-axis slider, the X-axis guide rail and the X-axis slider.

Effect of the Invention

The embodiment of the present invention produces an effect of having excellent yawing attitude precision.

PREFERRED EMBODIMENTS FOR CARRYING OUT THE INVENTION

<X-Y Constraining Unit and Stage Apparatus>
(First Embodiment)

A first embodiment of the X-Y constraining unit and the stage apparatus of the present invention is described in details below with reference to FIGS. 1 to 4.

Figure 1:
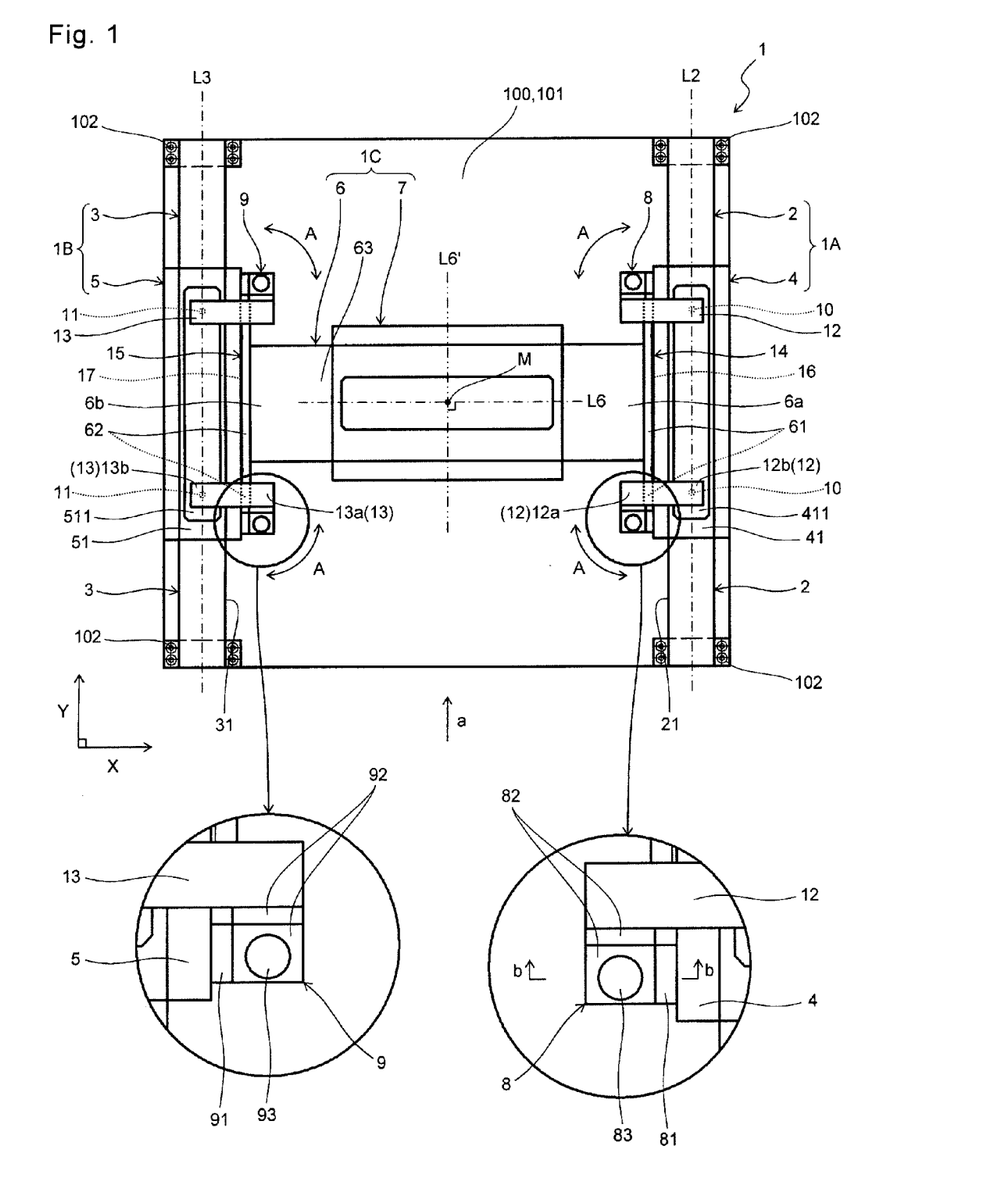
FIG. 1 is a plan view (top view) showing an X-Y constraining unit and a stage apparatus according to a first embodiment of the present invention.
Figure 2:
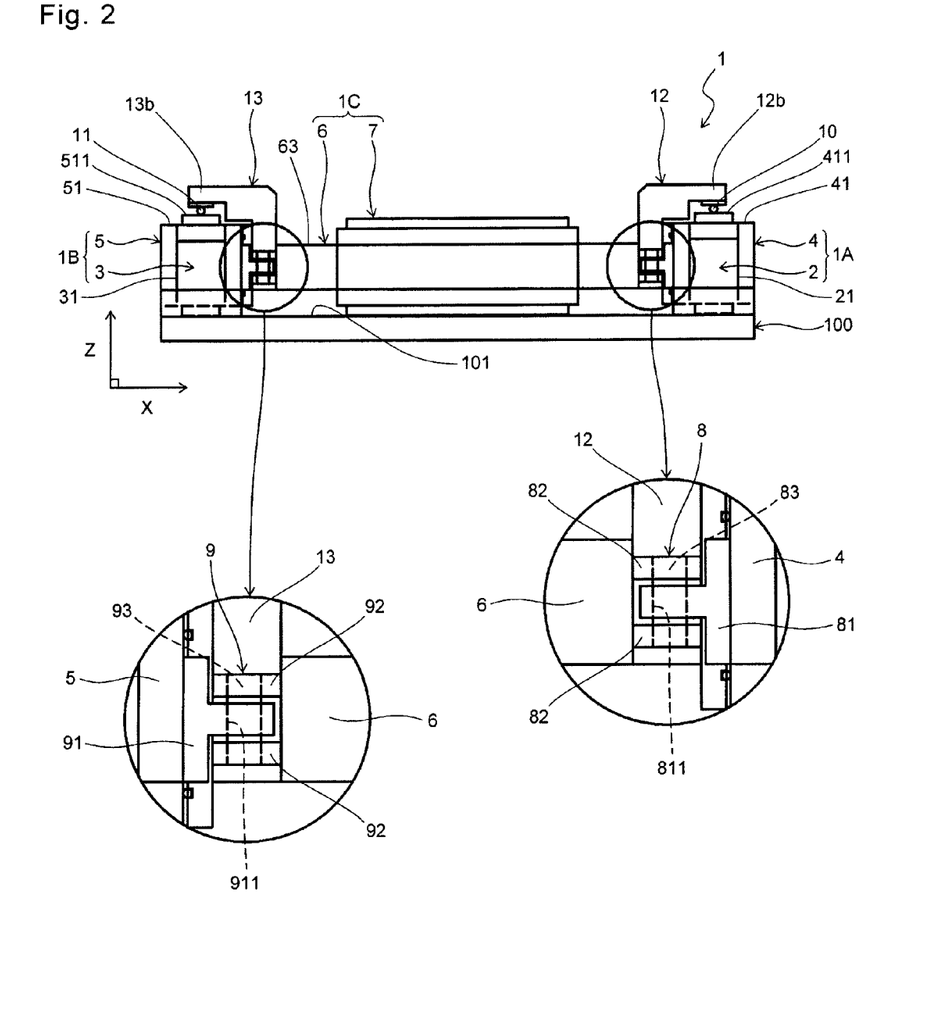
FIG. 2 is a side view in a direction of arrow a in FIG. 1.

The X-Y constraining unit of the present embodiment includes a first X-Y constraining unit 8 and a second X-Y constraining unit 9, which are included in the stage apparatus 1, as shown in FIGS. 1 and 2. The stage apparatus 1 of the present embodiment includes a substantially flat plate-shaped stage base 100 having a flat upper surface 101. The stage apparatus 1 of the present embodiment also includes a first Y-axis guide rail 2 and a second Y-axis guide rail 3 located on the upper surface 101 and spaced apart from each other by a predetermined distance. In the present embodiment, the first Y-axis guide rail 2 and the second Y-axis guide rail 3 are respectively a square shaft of a rectangular prism-like shape extending in parallel to Y direction, and their both end parts are fixed to the stage base 100 by a plurality of fixing screws 102 as fixing members.

The first Y-axis guide rail 2 has a first guide surface 21 parallel to Y direction, and the second Y-axis guide rail 3 has a second guide surface 31 parallel to Y direction. In the present embodiment, the entire surface of the first Y-axis guide rail 2 in a circumferential direction thereof functions as the first guide surface 21, and the entire surface of the second Y-axis guide rail 3 in a circumferential direction thereof functions as the second guide surface 31.

The stage apparatus 1 of the present embodiment further includes a first Y-axis slider 4 movable in Y direction along the first guide surface 21, and a second Y-axis slider 5 movable in Y direction along the second guide surface 31.

The first Y-axis slider 4 of the present embodiment constitutes an aerostatic type first Y-axis air slide 1A together with the first Y-axis guide rail 2. Similarly, the second Y-axis slider 5 of the present embodiment constitutes an aerostatic type second Y-axis air slide 1B together with the second Y-axis guide rail 3.

To be specific, the first Y-axis slider 4 circumferentially surrounds a part of the first Y-axis guide rail 2. Similarly, the second Y-axis slider 5 surrounds a part of the second Y-axis guide rail 3. A micro clearance exists between the first Y-axis slider 4 and the first guide surface 21 and between the second Y-axis slider 5 and the second guide surface 31. A static pressure fluid layer is formed by supplying pressurized gas to these micro clearances, and the individual sliders are supported under static pressure against their corresponding guide surfaces, thereby allowing the first Y-axis air slide 1A and the second Y-axis air slide 1B to function as the aerostatic type air slide.

In the present embodiment, as shown in FIG. 1, the first Y-axis slider 4 and the second Y-axis slider 5 have a substantially rectangle-like shape in a top view. The phrase "top view" denotes a state that the stage apparatus 1 is viewed from the upper surface 101 of the stage base 100.

In the present embodiment, each of the first Y-axis slider 4 and the second Y-axis slider 5 is configured by combining a plurality of plate-shaped members as shown in FIG. 2. According to this configuration, the first Y-axis slider 4 and the second Y-axis slider 5 can be processed inexpensively with high precision. Alternatively, the first Y-axis slider 4 and the second Y-axis slider 5 may be configured by integral molding.

In the present embodiment, the first Y-axis slider 4 and the second Y-axis slider 5 have a laterally symmetrical shape. This configuration improves rigidity of the first Y-axis slider 4 and the second Y-axis slider 5, thereby suppressing deterioration of yawing attitude precision during acceleration and deceleration. This configuration also reduces fundamental frequency variations depending on the location of the first Y-axis slider 4 and the second Y-axis slider 5. Hence, oscillation can be reduced to ensure stable control.

On the other hand, the stage apparatus 1 of the present embodiment includes an X-axis guide rail 6 extending in X direction orthogonal to Y direction. As shown in FIG. 1, the X-axis guide rail 6 of the present embodiment includes a first connection plate 61 located at one end 6a thereof and a second connection plate 62 located at the other end 6b. The one end 6a of the X-axis guide rail 6 of the present embodiment is connected via the first connection plate 61 to the first Y-axis slider 4, and the other end 6b is connected via the second connection plate 62 to the second Y-axis slider 5. Alternatively, the X-axis guide rail 6 may be directly connected to the first Y-axis slider 4 and the second Y-axis slider 5.

The X-axis guide rail 6 of the present embodiment is a square shaft having a rectangular prism-like shape, and has a third guide surface 63 parallel to X direction. In the present embodiment, the entire surface of the X-axis guide rail 6 in a circumferential direction thereof functions as the third guide surface 63.

The stage apparatus 1 of the present embodiment includes an X-axis slider 7 movable in X direction along the third guide surface 63. The X-axis slider 7 of the present embodiment, together with the X-axis guide rail 6, constitutes an aerostatic type X-axis air slide 1C that is similar to the foregoing first Y-axis air slide 1A and second Y-axis air slide 1B. That is, the X-axis slider 7 of the present embodiment circumferentially surrounds a part of the X-axis guide rail 6. Micro clearances exist between the X-axis slider 7 and the third guide surface 63. A static pressure fluid layer is formed by supplying pressurized gas to these micro clearances, and the X-axis slider 7 is supported under static pressure against the third guide surface 63, thereby allowing the X-axis air slide 1C to function as the aerostatic type air slide.

The stage apparatus 1 of the present embodiment includes an unshown table located on the X-axis slider 7. The table is for mounting thereon a target transport object, such as a semiconductor wafer. By moving the first Y-axis slider 4 and the second Y-axis slider 5 in Y direction, and by moving the X-axis slider 7 in X direction, the table is movable in the X and Y directions so as to position the target transport object.

As shown in FIG. 1, the X-axis slider 7 of the present embodiment has a substantially rectangle-like shape in the top view. The X-axis air slide 1C and the foregoing first Y-axis air slide 1A and second Y-axis air slide 1B are arranged in an H-shape on the upper surface 101 of the stage base 100.

The stage apparatus 1 of the present embodiment includes the first X-Y constraining unit 8 and the second X-Y constraining unit 9 as described above. In the present embodiment, the first X-Y constraining unit 8 is configured to connect the first Y-axis slider 4 and the X-axis guide rail 6, and the second X-Y constraining unit 9 is configured to connect the second Y-axis slider 5 and the X-axis guide rail 6.

More specifically, in the present embodiment, the first X-Y constraining unit 8 is connected via a first arm 12 described later to the one end 6a of the X-axis guide rail 6, and the second X-Y constraining unit 9 is connected via a second arm 13 described later to the other end 6b of the X-axis guide rail 6. Alternatively, the first X-Y constraining unit 8 and the second X-Y constraining unit 9 may be directly connected to the X-axis guide rail 6.

The first X-Y constraining unit 8 allows the X-axis guide rail 6 and the first Y-axis slider 4 to be rotated in a direction of arrow A around Z direction orthogonal to each of X direction and Y direction. Similarly, the second X-Y constraining unit 9 allows the X-axis guide rail 6 and the second Y-axis slider 5 to be rotated in the direction of arrow A around Z direction.

The stage apparatus 1 of the present embodiment includes a first support ball 10 mounted on the first Y-axis slider 4 and a second support ball 11 mounted on the second Y-axis slider 5. In the present embodiment, the first support ball 10 is mounted on an upper surface 41 of the first Y-axis slider 4, and the second support ball 11 is mounted on an upper surface 51 of the second Y-axis slider 5.

More specifically, the upper surface 41 of the first Y-axis slider 4 has a first mount part 411 located at a substantially middle part thereof. The first support ball 10 is mounted on the upper surface 41 with the first mount part 411 interposed therebetween. Similarly, the upper surface 51 of the second Y-axis slider 5 has a second mount part 511 located at a substantially middle part thereof. The second support ball 11 is mounted on the upper surface 51 with the second mount part 511 interposed therebetween.

As shown in FIG. 1, the first support ball 10 of the present embodiment is located on a center line L2 of the first Y-axis guide rail 2 when viewed from a direction perpendicular to an X-Y plane parallel to X direction and Y direction, in order words, in a top view. Similarly, the second support ball 11 of the present embodiment is located on a center line L3 of the second Y-axis guide rail 3 in the top view.

The stage apparatus 1 of the present embodiment includes a first arm 12 whose one end 12a is connected to the X-axis guide rail 6 and the other end 12b is supported on the first support ball 10, and a second arm 13 whose one end 13a is connected to the X-axis guide rail 6 and the other end 13b is supported on the second support ball 11. That is, in the present embodiment, a structure for mounting the first arm 12 on the first support ball 10 is used to connect the X-axis guide rail 6 and the first Y-axis slider 4 in Z direction. Similarly, a structure for mounting the second arm 13 on the second support ball 11 is used to connect the X-axis guide rail 6 and the second Y-axis slider 5 in Z direction.

Figure 4:
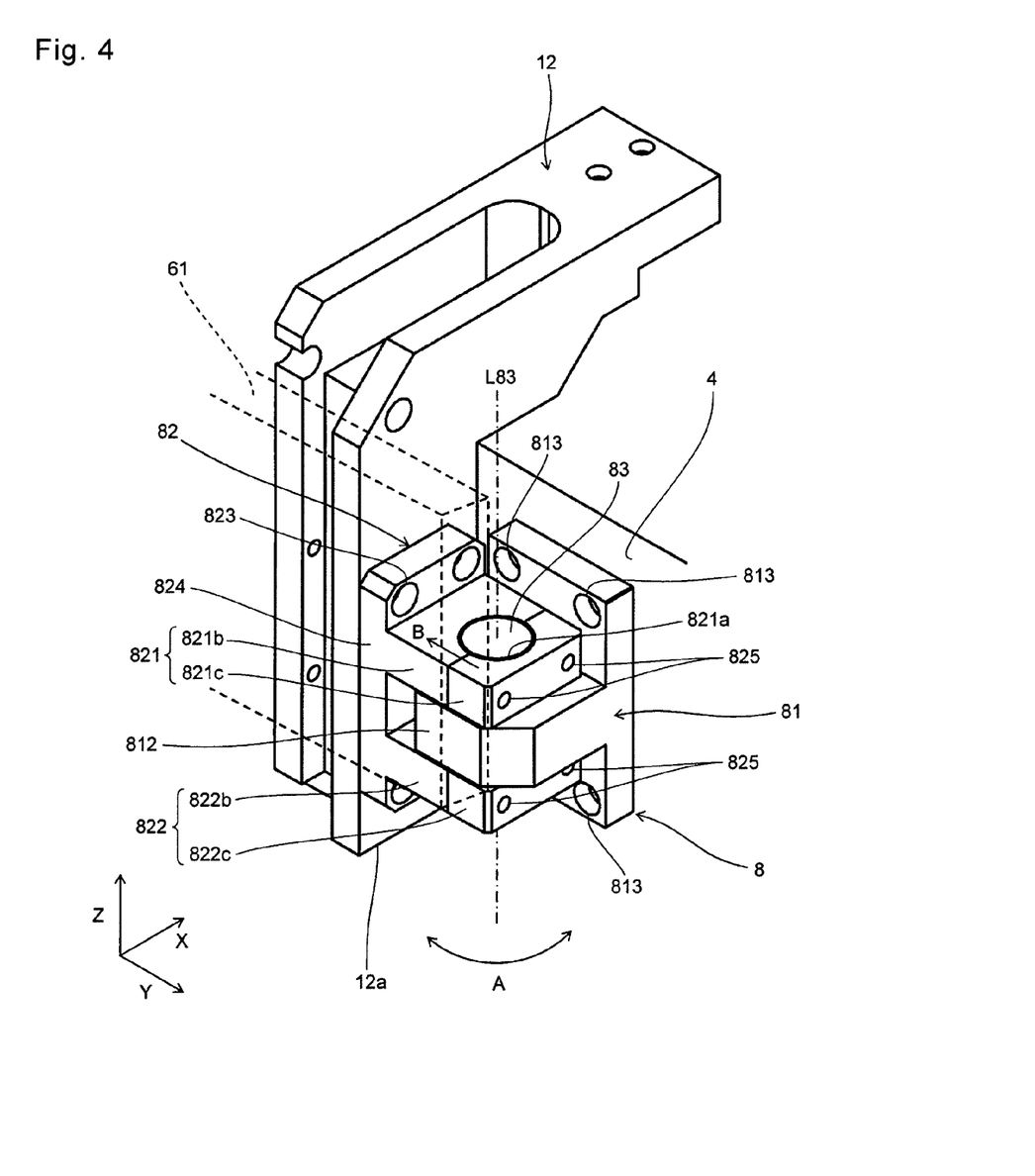
FIG. 4 is a partially enlarged perspective view showing a first X-Y constraining unit and the vicinity of the X-Y constraining unit in the stage apparatus in FIG. 1.

The one end 12a of the first arm 12 of the present embodiment is connected via the first connection plate 61 to the one end 6a of the X-axis guide rail 6 as shown in FIGS. 1 and 4. Similarly, the one end 13a of the second arm 13 of the present embodiment is connected via the second connection plate 62 to the other end 6b of the X-axis guide rail 6. Alternatively, the one end 12a of the first arm 12 and the one end 13a of the second arm 13 may be directly connected to the X-axis guide rail 6. Although the other end 12b of the first arm 12 is supported on the first support ball 10, the first support ball 10 is located on the center line L2 of the first Y-axis guide rail 2 in the top view as described above. According to this configuration, the other end 12b of the first arm 12 is supported on the support ball 10 in a well-balanced manner, thereby improving connection stability of the X-axis guide rail 6 and the first Y-axis slider 4 in Z direction. This is also true for the other end 13b of the second arm 13 in the present embodiment.

As shown in FIGS. 1 to 4, the foregoing first X-Y constraining unit 8 includes a first Y-axis base 81 having a first through hole 811 extending along Z direction, a first X-axis base 82, part of which is located so as to vertically sandwich the first through hole 811, a first shaft 83 inserted into the through hole 811, and a plurality of first bearing balls 84 arranged so as to circumferentially surround the first shaft 83. Individual components of the first X-Y constraining unit 8 of the present embodiment are described in details below.

Figure 3:
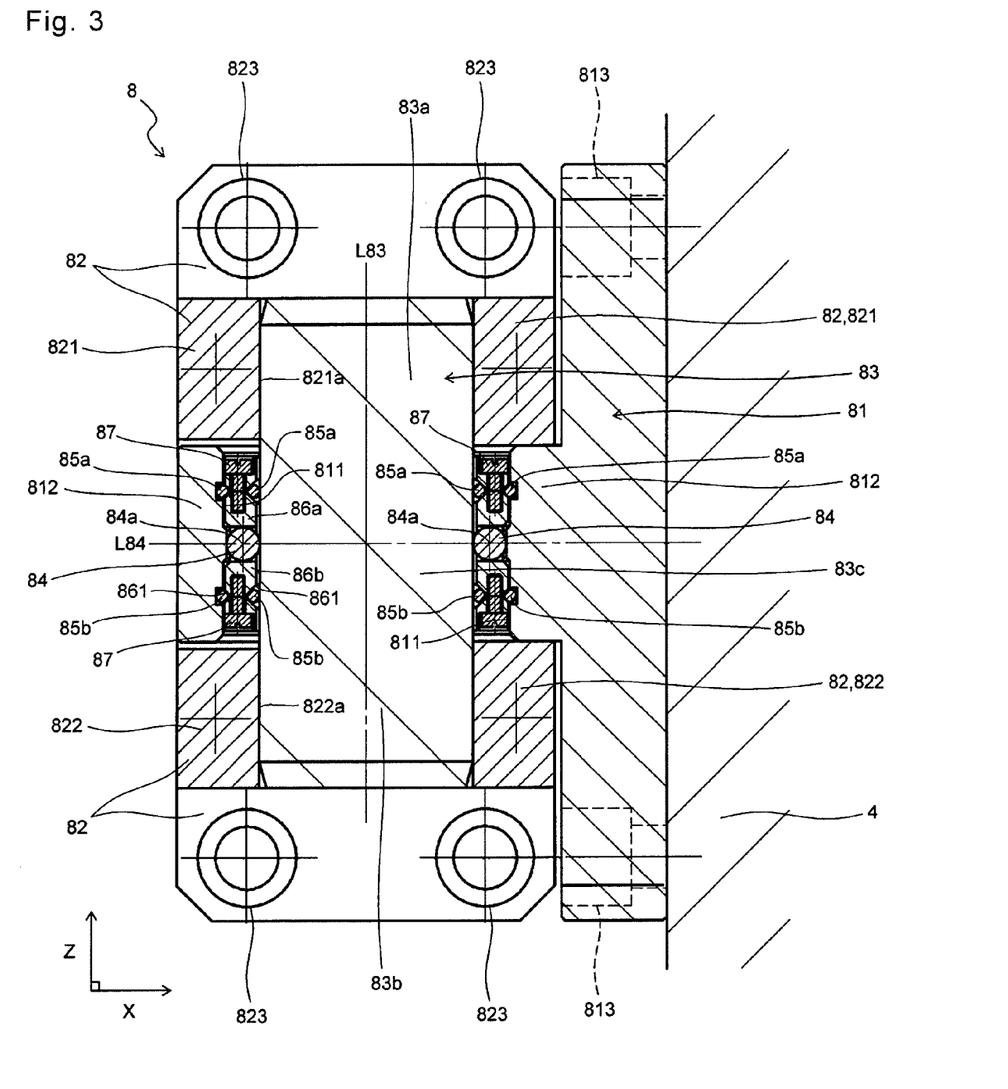
FIG. 3 is an enlarged sectional view taken along line b-b in FIG. 1.

As shown in FIGS. 3 and 4, the first Y-axis base 81 of the present embodiment is connected to the first Y-axis slider 4 by screw fixing via a plurality of screw insertion holes 813 located in the vicinity of both end parts of the first Y-axis base 81 in Z direction. The first Y-axis base 81 of the present embodiment also includes a first insertion part 812 extending in X direction from a substantially middle part of the first Y-axis base 81 in Z direction. As shown in FIG. 3, the foregoing first through hole 811 is located at a substantially middle part of the first insertion part 812, and the first shaft 83 is inserted into the first through hole 811. As shown in FIG. 4, the first X-Y constraining unit 8 allows the X-axis guide rail 6 and the first Y-axis slider 4 to be slightly rotated in a direction of arrow A around a center line L83 of the first shaft 83 that extends along Z direction.

On the other hand, the first X-axis base 82 is connected to the X-axis guide rail 6. The first X-axis base 82 may be connected via the first arm 12 to the X-axis guide rail 6, or alternatively, may be directly connected to the X-axis guide rail 6. As shown in FIG. 4, the first X-axis base 82 of the present embodiment is connected via the first arm 12 to the X-axis guide rail 6 by screw fixing via a plurality of screw insertion holes 823 located in the vicinity of both end parts of the first X-axis base 82 in Z direction.

As shown in FIG. 3, the first shaft 83 has a substantially column-like shape and is inserted into the first through hole 811 as described above. An upper part 83a and a lower part 83b of the first shaft 83 which are exposed from the first through hole 811 are fixed to the foregoing first X-axis base 82.

To be specific, the first X-axis base 82 of the present embodiment includes a first upper fixing part 821 for fixing the upper part 83a of the first shaft 83 and a first lower fixing part 822 for fixing the lower part 83b. As shown in FIG. 4, the first upper fixing part 821 is the part that extends in Y direction from an upper part of the first X-axis base 82 in Z direction, and the first upper fixing part 821 has, at a substantially middle part thereof, a first upper through hole 821a extending along Z direction. Similarly, as shown in FIG. 3, the first lower fixing part 822 is the part that extends in Y direction from a lower part of the first X-axis base 82 in Z direction, and the first lower fixing part 822 has, at a substantially middle part thereof, a first lower through hole 822a extending along Z direction.

The upper part 83a of the first shaft 83 is inserted into the first upper through hole 821a, a middle part 83c thereof is inserted into the first through hole 811, and the lower part 83b thereof is inserted into the first lower through hole 822a.

As shown in FIG. 4, the first upper fixing part 821 has one half portion 821b and the other half portion 821c which respectively correspond to a half-cut shape obtained by cutting the first upper through hole 821a in X direction and Y direction. The one half portion 821b is continuous with a basal end 824 of the first X-axis base 82, and the other half portion 821c is free to move. According to this configuration, the upper part 83a of the first shaft 83 can be fixed by the first upper fixing part 821 in the following manner.

Firstly, the upper part 83a of the first shaft 83 is held between the one half portion 821b and the other half portion 821c. Then, an unshown pair of fixing screws are respectively inserted into a pair of screw insertion holes 825 and 825 located at the other half portion 821c, and the individual leading ends of the fixing screws are fitted into an unshown pair of screw holes located at the one half portion 821b. Upon fastening of the other half portion 821c in a direction of arrow B by the foregoing pair of fixing screws, the upper part 83a of the first shaft 83 is fixed by the first upper fixing part 821 while being held between the one half portion 821b and the other half portion 821c.

Similarly to the foregoing first upper fixing part 821, the first lower fixing part 822 has one half portion 822b and the other half portion 822c. Therefore, the lower part 83b of the first shaft 83 can be fixed by the first lower fixing part 822 in the same manner as in the foregoing first upper fixing part 821. Consequently, the upper part 83a and the lower part 83b of the first shaft 83 can be individually fixed to the first X-axis base 82.

On the other hand, as shown in FIG. 3, the plurality of first bearing balls 84 are located between an inner peripheral surface of the first through hole 811 and an outer peripheral surface of the first shaft 83. In the present embodiment, the plurality of first bearing balls 84 are located between the inner peripheral surface of the third through hole 811 and an outer peripheral surface of the middle part 83c in the outer peripheral surface of the first shaft 83. The plurality of first bearing balls 84 are arranged so as to circumferentially surround the first shaft 83 as described above.

This configuration allows the plurality of first bearing balls 84 to function as a rotary bearing, and hence the X-axis guide rail 6 and the first Y-axis slider 4 are smoothly rotatable around the center line L83 of the first shaft 83. Additionally, the plurality of first bearing balls 84 form a single row structure that permits their free movement in a rolling direction of the first Y-axis slider 4, and hence the stage attitude precision can be improved by absorbing a rolling component of the first Y-axis slider 4.

The first X-Y constraining unit 8 of the present embodiment is generally comprised of the foregoing components. The second X-Y constraining unit 9 has the same configuration as the foregoing first X-Y constraining unit 8. That is, as shown in FIGS. 1 and 2, the second X-Y constraining unit 9 includes a second Y-axis base 91 that is connected to the second Y-axis slider 5 and has a second through hole 911 extending along Z direction, the second X-axis base 92 connected to the X-axis guide rail 6, the second shaft 93 inserted into a second through hole 911 and fixed to the second X-axis base 92, and an unshown plurality of second bearing balls which are located between an inner peripheral surface of the second through hole 911 and an outer peripheral surface of the second shaft 93, and are arranged so as to circumferentially surround the second shaft 93. Alternatively, the second X-axis base 92 may be connected via the second arm 13 to the X-axis guide rail 6, or alternatively, may be directly connected to the X-axis guide rail 6. Similarly to the foregoing first X-axis base 82, the second X-axis base 92 of the present embodiment is connected via the second arm 13 to the X-axis guide rail 6.

The above configuration produces the following effect. That is, the present embodiment including the first X-Y constraining unit 8 and the second X-Y constraining unit 9 as well as the first arm 12 and the second arm 13 is capable of imparting a degree of freedom in the rotational direction as indicated by arrow A to the connection structure of the X-axis guide rail 6 and the first Y-axis slider 4 and to the connection structure of the X-axis guide rail 6 and the second Y-axis slider 5. Consequently, even when the first Y-axis slider 4 and the second Y-axis slider 5 are individually driven, displacement during control is absorbed by the first X-Y constraining unit 8 and the second X-Y constraining unit 9, and consequently the displacement is less apt to be propagated to the individual sliders, thereby preventing deterioration of the yawing attitude precision. It is also capable of reducing stress exerted on the first Y-axis slider 4 and the second Y-axis slider 5 that are connected to the X-axis guide rail 6, thereby ensuring an amount of levitation. It is therefore capable of preventing such an occasion that the first Y-axis slider 4 and the second Y-axis slider 5 as well as the first Y-axis guide rail 2 and the second Y-axis guide rail 3 come into contact with each other and become unmovable. Further, the accuracy of the components related to the connection can be relaxed, thus permitting a relatively easy assembly of the stage apparatus 1. Even in the case of being out of control, the first X-Y constraining unit 8 and the second constraining unit 9 absorb stress and make it difficult for the stress to concentrate at the connection structures, thereby preventing breakage of the first Y-axis slider 4 and the second Y-axis slider 5. That is, according to the foregoing configuration, the connection structures have the degree of freedom in the yawing direction, and therefore, even in the case of being out of control, the impact force thereof can be absorbed. In the event of breakage, the breakage is limited to the first X-Y constraining unit 8 and the second X-Y constraining unit 9. Hence, maintenance needed to recover from the breakage is to replace only the individual X-Y constraining units, thus facilitating the maintenance.

In order to enhance the above effect, the stage apparatus 1 of the present embodiment includes two sets of the first X-Y constraining unit 8 and the second X-Y constraining unit 9, as shown in FIG. 1. These two first X-Y constraining units 8 and 8 are spaced apart from each other with the X-axis guide rail 6 interposed therebetween in the X-Y plane parallel to X direction and Y direction. Similarly, the two second X-Y constraining units 9 and 9 are spaced apart from each other with the X-axis guide rail 6 interposed therebetween in the X-Y plane.

According to the above configuration, the four X-Y constraining units allow the foregoing connection structures to have the degree of freedom in the rotational direction as indicated by arrow A while holding the laterally symmetrical shape of the four X-Y constraining units. Hence, the displacement during control when the first Y-axis slider 4 and the second Y-axis slider 5 are individually driven, and the stress exerted when they are out of control can be absorbed in a well-balanced manner by the four X-Y constraining units, and consequently enhancing the foregoing effect.

The two first X-Y constraining units 8 and 8 of the present embodiment are located symmetrically around the center line L6 of the X-axis guide rail 6 in the top view. Similarly, the two second X-Y constraining units 9 and 9 of the present embodiment are located symmetrically around the center line L6 of the X-axis guide rail 6 in the top view. In the present embodiment, the two first X-Y constraining units 8 and 8 and the two second X-Y constraining units 9 and 9 are located laterally symmetrically around a straight line L6' which passes through a middle point M of the center line L6 of the X-axis guide rail 6 and is perpendicular to the center line L6 when viewed from a direction perpendicular to the X-Y plane, in order words, in the top view. According to this configuration, the effect owing to the two first X-Y constraining units 8 and 8 and the two second X-Y constraining units 9 and 9 can be achieved in a well-balanced manner.

The stage apparatus 1 of the present embodiment includes the two first X-Y constraining units 8 and the two second X-Y constraining units 9, and accordingly includes the two first arms 12 and the two second arms 13 as well as the two first support balls 10 and the two second support balls 11.

As shown in FIG. 3, the first X-Y constraining unit 8 of the present embodiment further includes a pair of first bearing O-rings 85*a* and 85*b* that circumferentially surround the middle part 83*c* of the first shaft 83 and are spaced apart from each other with the plurality of first bearing balls 84 interposed therebetween in Z direction. Similarly, the second X-Y constraining unit 9 of the present embodiment further includes an unshown pair of second bearing O-rings that circumferentially surround the second shaft 93 and are spaced apart from each other with the plurality of second bearing balls interposed therebetween in Z direction. According to this configuration, the pair of first bearing O-rings 85*a* and 85*b* and the pair of second bearing O-rings function as a damping member. Therefore, vibrations that can occur when the first Y-axis slider 4 and the second Y-axis slider 5 are stopped can be damped quickly, thereby shortening positioning time of the first Y-axis slider 4 and the second Y-axis slider 5.

In order to enhance the above effect, the first X-Y constraining unit 8 of the present embodiment includes two pairs of the first bearing O-rings 85*a* and 85*b*. That is, the first X-Y constraining unit 8 of the present embodiment includes the two first bearing O-rings 85*a* and 85*a* and the two first bearing O-rings 85*b* and 85*b*. The two first bearing O-rings 85*a* and 85*a* and the two first bearing O-rings 85*b* and 85*b* are respectively attached to two retainers 86*a* and 86*b* included in the first X-Y constraining unit 8.

To be specific, the two retainers 86*a* and 86*b* of the present embodiment have a ring-like shape and have notch portions 861 and 861 on their respective outer peripheral surface and their inner peripheral surface. These notch portions 861 and 861 respectively store the two first bearing O-rings 85*a* and 85*a* and the two first bearing O-rings 85*b* and 85*b*.

The two first bearing O-rings 85*a* and 85*a* are spacedly attached to the retainer 86*a* by interposing the individual leading ends of a plurality of attachment screws 87 between the first bearing O-rings 85*a* and 85*a* adjacent to each other. Similarly, the two first bearing O-rings 85*b* and 85*b* are spacedly attached to the retainer 86*b* by interposing the individual leading ends of the plurality of attachment screws 87 between the first bearing O-rings 85*b* and 85*b* adjacent to each other.

In order to enhance the foregoing effect, the first X-Y constraining unit 8 of the present embodiment is located so that the pair of first bearing O-rings 85*a* and 85*b* are vertically symmetrical. That is, the pair of first bearing O-rings 85*a* and 85*b* of the present embodiment are located vertically symmetrically around a straight line L84 connecting centers 84*a* and 84*a* of the two most separated first bearing balls 84 and 84 among the plurality of first bearing balls 84.

The second X-Y constraining unit 9 of the present embodiment has the same configuration as the first X-Y constraining unit 8, and accordingly includes two pairs of second bearing O-rings similarly to the first X-Y constraining unit 8. The individual second bearing O-rings are respectively attached to two retainers, and the pair of second bearing O-rings are located vertically symmetrically. Some examples of material constituting the pair of first bearing O-rings 85*a* and 85*b* and the pair of second bearing O-rings are rubbers, such as nitrile butadiene rubber and fluororubber. Some examples of material constituting the retainers are resins, such as Teflon (registered trademark).

The first X-axis base 82, the second X-axis base 92, the first Y-axis base 81, the second Y-axis base 91, the first shaft 83, the second shaft 93, the first bearing ball 84 and the second bearing ball are preferably formed from ceramics. This reduces hysteresis and thus improves reproducibility of attitude precision. Some examples of the ceramics are alumina, zirconia and silicon nitride.

On the other hand, as shown in FIG. 1, the stage apparatus 1 of the present embodiment includes a first connection part 14 that is the connection part of the first Y-axis slider 4 and the X-axis guide rail 6, and a second connection part that is the connection part of the second Y-axis slider 5 and the X-axis guide rail 6. In the present embodiment, the first connection part 14 is the connection part of the one end 6*a* of the X-axis guide rail 6 and the first Y-axis slider 4 with the foregoing first connection plate 61 interposed therebetween. In the present embodiment, the second connection part 15 is the connection part of the other end 6*b* of the X-axis guide rail 6 and the second Y-axis slider 5 with the foregoing second connection plate 62 interposed therebetween.

The stage apparatus 1 of the present embodiment further includes a first interposed O-ring 16 interposed between the first Y-axis slider 4 and the first connection plate 61 of the X-axis guide rail 6 in the first connection part 14, and a second interposed O-ring 17 interposed between the second Y-axis slider 5 and the second connection plate 62 of the X-axis guide rail 6 in the second connection part 15. According to this configuration, the first interposed O-ring 16 and the second interposed O-ring 17 function as a damping member. Therefore, vibrations that can occur when the first Y-axis slider 4 and the second Y-axis slider 5 are stopped can be damped quickly, thereby shortening positioning time of the first Y-axis slider 4 and the second Y-axis slider 5. Some examples of material constituting the first interposed O-ring 16 and the second interposed O-ring 17 are rubbers, such as nitrile butadiene rubber and fluororubber.

Unshown exhaust passages connected to each other in the first connection part 14 and the second connection part 15 are formed inside of each of the first Y-axis slider 4, the second Y-axis slider 5 and the X-axis guide rail 6. According to this configuration, the stage apparatus 1 of the present embodiment becomes vacuum compatible and hence becomes usable in vacuum. That is, the foregoing first interposed O-ring 16 and second interposed O-ring 17 ensures air-tight seal between the first Y-axis slider 4 and the X-axis guide rail 6 and between the second Y-axis slider 5 and the X-axis guide rail 6. Therefore, by connecting an exhaust means, such as a vacuum pump, to the exhaust passages, the pressurized gas supplied when forming the foregoing static pressure fluid layer can be exhausted to the outside through the exhaust passages, thus allowing the stage apparatus 1 to be used in situations where a degree of vacuum is retained.

(Second Embodiment)

X-Y constraining units and a stage apparatus according to a second embodiment of the present invention are described below. In the present embodiment, the X-Y constraining unit 8 and the second X-Y constraining unit 9 have a different configuration from those of the foregoing first embodiment. That is, in the first X-Y constraining unit 8 of the first embodiment, the first Y-axis base 81 has the first through hole 811, and the first shaft 83 is fixed to the first X-axis base 82. On the other hand, in the present embodiment, the first X-axis base 82 has the first through hole 811, and the first shaft 83 is fixed to the first Y-axis base 81.

Similarly, in the second X-Y constraining unit 9 of the first embodiment, the second Y-axis base 91 has the second through hole 911, and the second shaft 93 is fixed to the second X-axis base 92. On the other hand, in the present embodiment, the second X-axis base 92 has the second through hole 911, and the second shaft 93 is fixed to the second Y-axis base 91. The configuration of the second embodiment also produces the same effect as the X-Y constraining units and the stage apparatus 1 of the first embodiment.

Other configurations are similar to those in the X-Y constraining units and the stage apparatus 1 of the first embodiment, and therefore, a description thereof is omitted here.

(Third Embodiment)

X-Y constraining units and a stage apparatus according to a third embodiment of the present invention are described below. In the present embodiment, the X-Y constraining unit 8 has the same configuration as that of the foregoing first embodiment. That is, in the first X-Y constraining unit 8 of the present embodiment, the first Y-axis base 81 has the first through hole 811, and the first shaft 83 is fixed to the first X-axis base 82.

On the other hand, the second X-Y constraining unit 9 of the present embodiment has a different configuration from that of the foregoing first embodiment. That is, in the second X-Y constraining unit 9 of the first embodiment, the second Y-axis base 91 has the second through hole 911, and the second shaft 93 is fixed to the second X-axis base 92. On the other hand, in the present embodiment, the second X-axis base 92 has the second through hole 911, and the second shaft 93 is fixed to the second Y-axis base 91. This configuration also produces the same effect as the X-Y constraining units and the stage apparatus 1 of the first embodiment.

Other configurations are similar to those in the X-Y constraining units and the stage apparatus 1 of the first embodiment, and therefore, a description thereof is omitted here.

<Vacuum Stage Apparatus>

A vacuum stage apparatus according to an embodiment of the present invention is described below. The vacuum stage apparatus of the present embodiment includes the foregoing stage apparatus 1 and a vacuum chamber for storing therein the stage apparatus 1.

Exhaust passages connected to each other are formed inside of each of the first Y-axis guide rail 2, the first Y-axis slider 4, the second Y-axis guide rail 3, the second Y-axis slider 5, the X-axis guide rail 6 and the X-axis slider 7. By connecting an exhaust means, such as a vacuum pump, to these exhaust passages, the pressurized gas supplied when forming the foregoing static pressure fluid layer can be exhausted to the outside through the exhaust passages. Therefore, even when the stage apparatus 1 is stored inside the vacuum chamber, a degree of vacuum inside the vacuum chamber can be retained, thus allowing a target transport object to be transported and positioned at a predetermined position in vacuum. Additionally, the vacuum stage apparatus of the present embodiment includes the foregoing stage apparatus 1 and hence have excellent yawing attitude precision, thereby positioning the target transport object with high precision.

The vacuum stage apparatus of the present embodiment is suitably used, for example, for precision machining apparatuses and precision measuring instruments as well as drawing apparatuses and exposure apparatuses used in semiconductor manufacturing processes, without limitation thereto. That is, the vacuum stage apparatus of the present embodiment can suitably be used in fields in which it is required to transport and position a target transport object at a predetermined position in vacuum.

While the several embodiments of the present invention have been illustrated and described, it is to be understood that the present invention is not limited to the foregoing embodiments and many modifications and changes can be made without departing from the spirit and scope of the present invention.

For example, in the stage apparatus 1 of the foregoing first embodiment, the first Y-axis guide rail 2, the second Y-axis guide rail 3 and the X-axis guide rail 6 have the rectangular prism-like shape. Alternatively, the individual guide rails may have any other prism-like shape, such as triangular prism-like shape, pentagonal prism-like shape, or hexagonal prism-like shape.

[DESCRIPTION OF REFERENCE NUMERALS]
1: Stage apparatus
1A: First Y-axis air slide
1B: Second Y-axis air slide
2: First Y-axis guide rail
21: First guide surface
3: Second Y-axis guide rail
31: Second guide surface
4: First Y-axis slider
41: Upper surface
411: First mount part
5: Second Y-axis slider
51: Upper surface
511: Second mount part
6: X-axis guide rail
6a: One end
6b: The other end
61: First connection plate
62: Second connection plate
63: Third guide surface
7: X-axis slider
8: First X-Y constraining unit
81: First Y-axis base
811: First through hole
812: First insertion part
813: Screw insertion hole
82: First X-axis base
821: First upper fixing part
821a: First upper through hole
821b: One half portion
821c: The other half portion
822: First lower fixing part
822a: First lower through hole
822b: One half portion
822c: The other half portion
823: Screw insertion hole
824: Basal end part
825: Screw insertion hole
83: First shaft
83a: Upper part
83b: Lower part
83c: Middle part
84: First bearing ball
84a: Center
85a: First bearing O-ring
85b: First bearing O-ring
86a: Retainer
86b: Retainer
861: Notch part
87: Attachment screw
9: Second X-Y constraining unit
91: Second Y-axis base
911: Second through hole
92: Second X-axis base
93: Second shaft
10: First support ball
11: Second support ball
12: First arm
12a: One end
12b: The other end
13: Second arm
13a: One end
13b: The other end
14: First connection part
15: Second connection part
16: First interposed O-ring
17: Second interposed O-ring
100: Stage base
101: Upper surface
102: Fixing screw

What is claimed is:

1. An X-Y constraining unit, comprising:
a Y-axis base connectable to a Y-axis slider configured to move along a Y-axis on a virtual X-Y plane; and
an X-axis base connectable to an X-axis guide for guiding an X-axis slider configured to move along an X-axis on the virtual X-Y plane;
wherein the Y-axis base is connectable to the Y-axis slider and the X-axis base is connectable to the X-axis guide via a connection plate so as to ensure that the Y-axis base and the X-axis base are rotatable around an Z-axis intersecting the virtual X-Y plane.

2. The X-Y constraining unit according to claim 1, further comprising:
a hole disposed on at least one of the Y-axis base and the X-axis base; and
a connection member configured to be inserted into the hole so as to connect the Y-axis base and the X-axis base.

3. The X-Y constraining unit according to claim 2, further comprising a bearing member located between an inner peripheral surface of the hole and an outer peripheral surface of the connection member.

4. A stage apparatus, comprising:
the Y-axis slider and the X-axis guide according to claim 1; and
the X-Y constraining unit according to claim 1.

5. A stage apparatus, comprising:
a first Y-axis guide comprising a first guide surface parallel to a Y-axis on a virtual X-Y plane;
a second Y-axis guide comprising a second guide surface parallel to the Y-axis;
a first Y-axis slider movable along the Y-axis and along the first guide surface;
a second Y-axis slider movable along the Y-axis and along the second guide surface;
an X-axis guide having one end connected to the first Y-axis slider and another end connected to the second Y-axis slider, the X-axis guide comprising a third guide surface parallel to an X-axis on the virtual X-Y plane;
an X-axis slider movable along the X-axis and along the third guide surface;
a first X-Y constraining unit connecting the first Y-axis slider and the X-axis guide; and
a second X-Y constraining unit connecting the second Y-axis slider and the X-axis guide,
wherein each of the first X-Y constraining unit and the second X-Y constraining unit comprises
a Y-axis base connected to the Y-axis slider, and
an X-axis base connected to the X-axis guide via a connection plate, and
wherein the Y-axis base is connected to the Y-axis slider and the X-axis base is connected to the X-axis guide so as to ensure that the Y-axis base and the X-axis base are rotatable around an Z-axis intersecting the virtual X-Y plane.

6. The stage apparatus according to claim 5,
wherein the first X-Y constraining unit comprises
a first Y-axis base connected to the first Y-axis slider and comprising a first hole extending along the Z-axis orthogonal to the virtual X-Y plane,
a first X-axis base connected to the X-axis guide,
a first connection member inserted into the first hole and fixed to the first X-axis base, and
a first bearing member located between an inner peripheral surface of the first hole and an outer peripheral surface of the first connection member,
wherein the second X-Y constraining unit comprises
a second Y-axis base connected to the second Y-axis slider and comprising a second hole extending along the Z-axis,
a second X-axis base connected to the X-axis guide,
a second connection member inserted into the second hole and fixed to the second X-axis base, and
a second bearing member located between an inner peripheral surface of the second hole and an outer peripheral surface of the second connection member, and
wherein each of the first bearing member and the second bearing member comprises a plurality of bearing balls.

7. The stage apparatus according to claim 6, wherein the first X-axis base, the second X-axis base, the first Y-axis base, the second Y-axis base, the first connection member, the second connection member, the first bearing member and the second bearing member are comprised of ceramics.

8. The stage apparatus according to claim 6,
wherein the first X-Y constraining unit further comprises a pair of first bearing O-rings circumferentially surrounding the first connection member and being spaced apart from each other along the Z-axis with the first bearing member interposed between the pair of first bearing O-rings, and
wherein the second X-Y constraining unit further comprises a pair of second bearing O-rings circumferentially surrounding the second connection member and being spaced apart from each other along the Z-axis with the second bearing member interposed between the pair of second bearing O-rings.

9. The stage apparatus according to claim 5,
wherein the first X-Y constraining unit comprises
a first Y-axis base connected to the first Y-axis slider,
a first X-axis base connected to the X-axis guide and comprising a first hole extending along the Z-axis orthogonal to the virtual X-Y plane,
a first connection member inserted into the first hole and fixed to the first Y-axis base, and
a first bearing member located between an inner peripheral surface of the first hole and an outer peripheral surface of the first connection member,
wherein the second X-Y constraining unit comprises
a second Y-axis base connected to the second Y-axis slider,
a second X-axis base connected to the X-axis guide and comprising a second hole extending along the Z-axis,
a second connection member inserted into the second hole and fixed to the second Y-axis base, and
a second bearing member located between an inner peripheral surface of the second hole and an outer peripheral surface of the second connection member, and
wherein each of the first bearing member and the second bearing member comprises a plurality of bearing balls.

10. The stage apparatus according to claim 9, wherein the first X-axis base, the second X-axis base, the first Y-axis base, the second Y-axis base, the first connection member, the second connection member, the first bearing member and the second bearing member are comprised of ceramics.

11. The stage apparatus according to claim 9,
wherein the first X-Y constraining unit further comprises a pair of first bearing O-rings circumferentially surrounding the first connection member and being spaced apart from each other along the Z-axis with the first bearing member interposed between the pair of first bearing O-rings, and
wherein the second X-Y constraining unit further comprises a pair of second bearing O-rings circumferentially surrounding the second connection member and being spaced apart from each other along the Z-axis with the second bearing member interposed between the pair of second bearing O-rings.

12. The stage apparatus according to claim 5,
wherein the first X-Y constraining unit comprises
a first Y-axis base connected to the first Y-axis slider and comprising a first hole extending along the Z-axis orthogonal to the virtual X-Y plane,
a first X-axis base connected to the X-axis guide,
a first connection member inserted into the first hole and fixed to the first X-axis base, and
a first bearing member located between an inner peripheral surface of the first hole and an outer peripheral surface of the first connection member,
wherein the second X-Y constraining unit comprises
a second Y-axis base connected to the second Y-axis slider, a second X-axis base connected to the X-axis guide and comprising a second hole extending along the Z-axis, a second connection member inserted into the second hole and fixed to the second Y-axis base, and a second bearing member located between an inner peripheral surface of the second hole and an outer peripheral surface of the second connection member, and wherein each of the first bearing member and the second bearing member comprises a plurality of bearing balls.

13. The stage apparatus according to claim 12, wherein the first X-axis base, the second X-axis base, the first Y-axis base, the second Y-axis base, the first connection member, the second connection member, the first bearing member and the second bearing member are comprised of ceramics.

14. The stage apparatus according to claim 12, wherein the first X-Y constraining unit further comprises a pair of first bearing O-rings circumferentially surrounding the first connection member and being spaced apart from each other along the Z-axis with the first bearing member interposed between the pair of first bearing O-rings, and wherein the second X-Y constraining unit further comprises a pair of second bearing O-rings circumferentially surrounding the second connection member and being spaced apart from each other along the Z-axis with the second bearing member interposed between the pair of second bearing O-rings.

15. The stage apparatus according to claim 5, further comprising:

a first support ball mounted on the first Y-axis slider;

a second support ball mounted on the second Y-axis slider;

a first arm having one end connected to the X-axis guide and another end supported on the first support ball; and a second arm having one end connected to the X-axis guide and another end supported on the second support ball.

16. The stage apparatus according to claim 15, wherein the first support ball is disposed on a center line of the first Y-axis guide and the second support ball is disposed on a center line of the second Y-axis guide as viewed from a direction perpendicular to the virtual X-Y plane.

17. The stage apparatus according to claim 5, comprising two sets of the first X-Y constraining unit and the second X-Y constraining unit, wherein the two first X-Y constraining units are spaced apart from each other with the X-axis guide interposed therebetween on the virtual X-Y plane, and wherein the two second X-Y constraining units are spaced apart from each other with the X-axis guide interposed therebetween on the virtual X-Y plane.

18. The stage apparatus according to claim 17, wherein the two first X-Y constraining units and the two second X-Y constraining units are symmetrically located using a center line of the X-axis guide as a symmetry axis, and are orthogonal to the center line as viewed from a direction perpendicular to the virtual X-Y plane.

19. The stage apparatus according to claim 5, further comprising:

a first interposed O-ring interposed between the first Y-axis slider and the X-axis guide in a first connection part of the first Y-axis slider and the X-axis guide; and a second interposed O-ring interposed between the second Y-axis slider and the X-axis guide in a second connection part of the second Y-axis slider and the X-axis guide, wherein exhaust passages connected to each other in the first connection part and the second connection part are formed inside of each of the first Y-axis slider, the second Y-axis slider and the X-axis guide.

20. A stage apparatus according to claim 5 for use in a vacuum chamber, the stage apparatus further comprising exhaust passages that are connected to each other and are formed inside of each of the first Y-axis guide, the first Y-axis slider, the second Y-axis guide, the second Y-axis slider, the X-axis guide and the X-axis slider.

* * * * *